(12) United States Patent
Kollias

(10) Patent No.: US 10,293,756 B1
(45) Date of Patent: May 21, 2019

(54) COLLAPSIBLE ARTICLE ORGANIZER FOR AIRLINER USE

(71) Applicant: Michael C Kollias, Chicago, IL (US)

(72) Inventor: Michael C Kollias, Chicago, IL (US)

(*) Notice: Subject to any disclaimer, the term of this patent is extended or adjusted under 35 U.S.C. 154(b) by 1129 days.

(21) Appl. No.: 14/088,490

(22) Filed: Nov. 25, 2013

Related U.S. Application Data

(60) Provisional application No. 61/790,687, filed on Mar. 15, 2013.

(51) Int. Cl.
| | |
|---|---|
| *B60R 7/08* | (2006.01) |
| *B60R 7/10* | (2006.01) |
| *B60R 9/02* | (2006.01) |
| *B64D 11/00* | (2006.01) |
| *B64D 11/06* | (2006.01) |

(52) U.S. Cl.
CPC .............. *B60R 7/08* (2013.01); *B60R 7/10* (2013.01); *B60R 9/02* (2013.01); *B64D 11/00* (2013.01); *B64D 11/00152* (2014.12); *B64D 11/0638* (2014.12)

(58) Field of Classification Search
CPC .............. B60R 7/10; B60R 9/02; B60N 3/103
USPC .............. 224/482, 414; 248/311.2
See application file for complete search history.

(56) References Cited

U.S. PATENT DOCUMENTS

| | | | | |
|---|---|---|---|---|
| 1,915,958 | A * | 6/1933 | Skirrow | B60N 3/007 108/44 |
| 1,933,374 | A * | 10/1933 | Haggard | A47F 5/08 211/90.01 |
| 2,616,647 | A | 11/1952 | Murchinson | |
| 2,832,498 | A | 4/1958 | Parsons | |
| 3,139,255 | A * | 6/1964 | Palm | G09F 5/00 224/906 |
| 3,367,610 | A | 2/1968 | Lindquist | |
| 3,712,235 | A * | 1/1973 | Russ | B60N 3/103 108/46 |
| 4,275,862 | A * | 6/1981 | Takagi | A45D 27/29 248/205.3 |
| 4,653,637 | A | 3/1987 | Wallace | |
| 4,810,026 | A | 3/1989 | Doane | |
| 4,858,796 | A | 8/1989 | Roth | |
| 4,953,772 | A * | 9/1990 | Phifer | B60N 3/102 220/737 |
| 5,100,090 | A * | 3/1992 | Drower | A47B 96/027 108/152 |

(Continued)

FOREIGN PATENT DOCUMENTS

GB 2223935 A 4/1990

*Primary Examiner* — Justin M Larson
*Assistant Examiner* — Lester L Vanterpool
(74) *Attorney, Agent, or Firm* — The Law Offices Konrad Sherinian LLC

(57) ABSTRACT

An article organizer includes three interconnected panels which are foldable relative to each other from a flat position to an assembled position. One panel is a base panel that attaches to the window frame of an airline cabin window. A second panel is a support panel that extends outwardly from the base panel, transversely thereto and has opening into which articles may be placed. The third panel is a brace panel that extends at an angle to the base and support panels and which gives the organizer an overall triangular shape. Openings in the brace panel create support edges that engage the bottoms of articles placed in the support panel openings.

18 Claims, 9 Drawing Sheets

(56) References Cited

U.S. PATENT DOCUMENTS

| | | | | |
|---|---|---|---|---|
| 5,141,194 A * | 8/1992 | Burgess | ................ | B60N 3/102 |
| | | | | 248/150 |
| 5,641,079 A * | 6/1997 | Schmidt | ................ | A47F 5/0823 |
| | | | | 211/104 |
| 6,068,127 A | 5/2000 | Hunter | | |
| 6,176,405 B1 * | 1/2001 | Roach | ................ | B62J 11/00 |
| | | | | 224/413 |
| 6,371,428 B1 * | 4/2002 | Zorich | ................ | A47C 7/70 |
| | | | | 206/549 |
| 8,091,702 B1 * | 1/2012 | Keip | ................ | A47G 23/0208 |
| | | | | 206/171 |
| 9,064,434 B2 * | 6/2015 | Alford | ................ | B60N 3/103 |
| 2014/0158844 A1 | 6/2014 | Krieger | | |

* cited by examiner

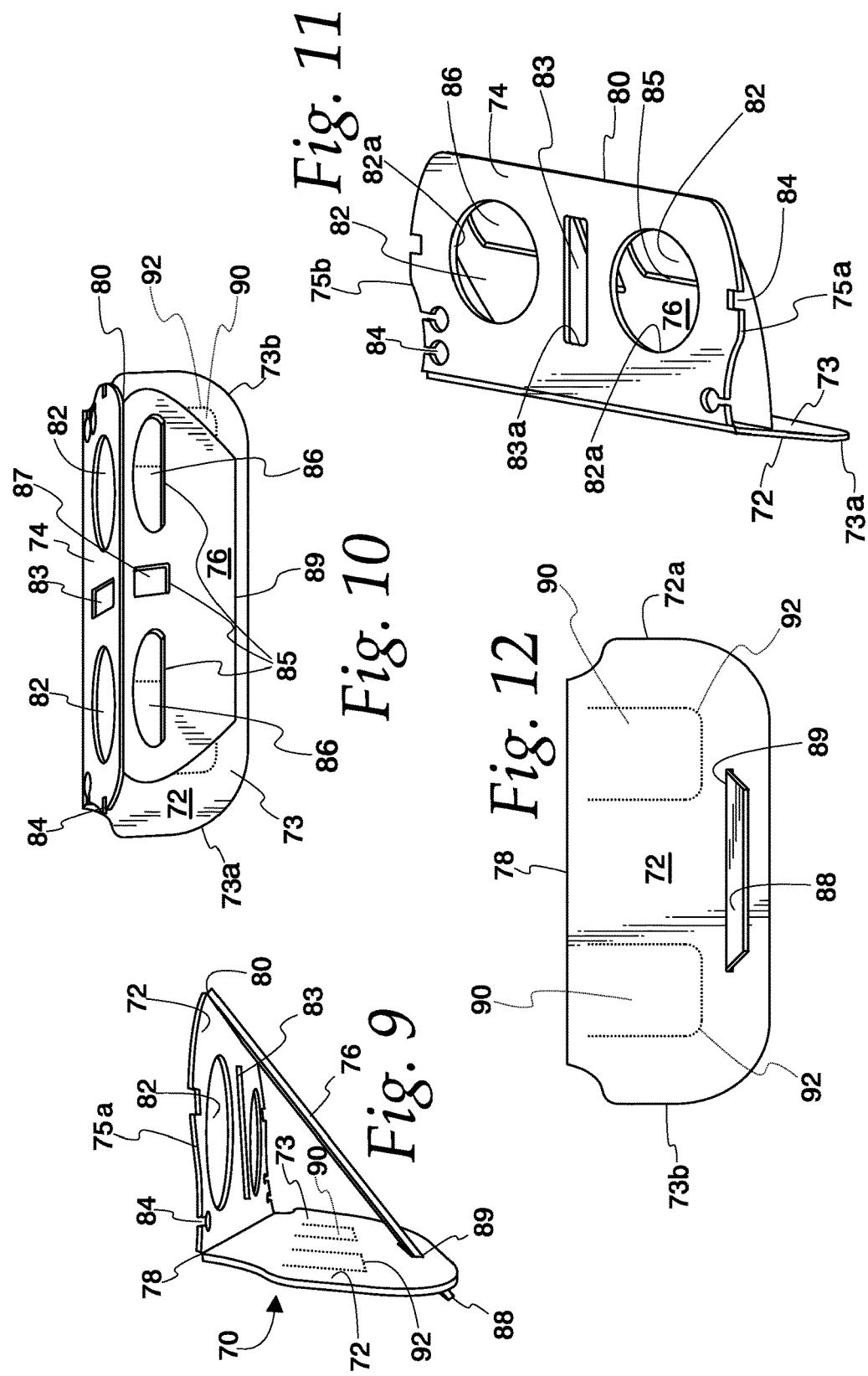

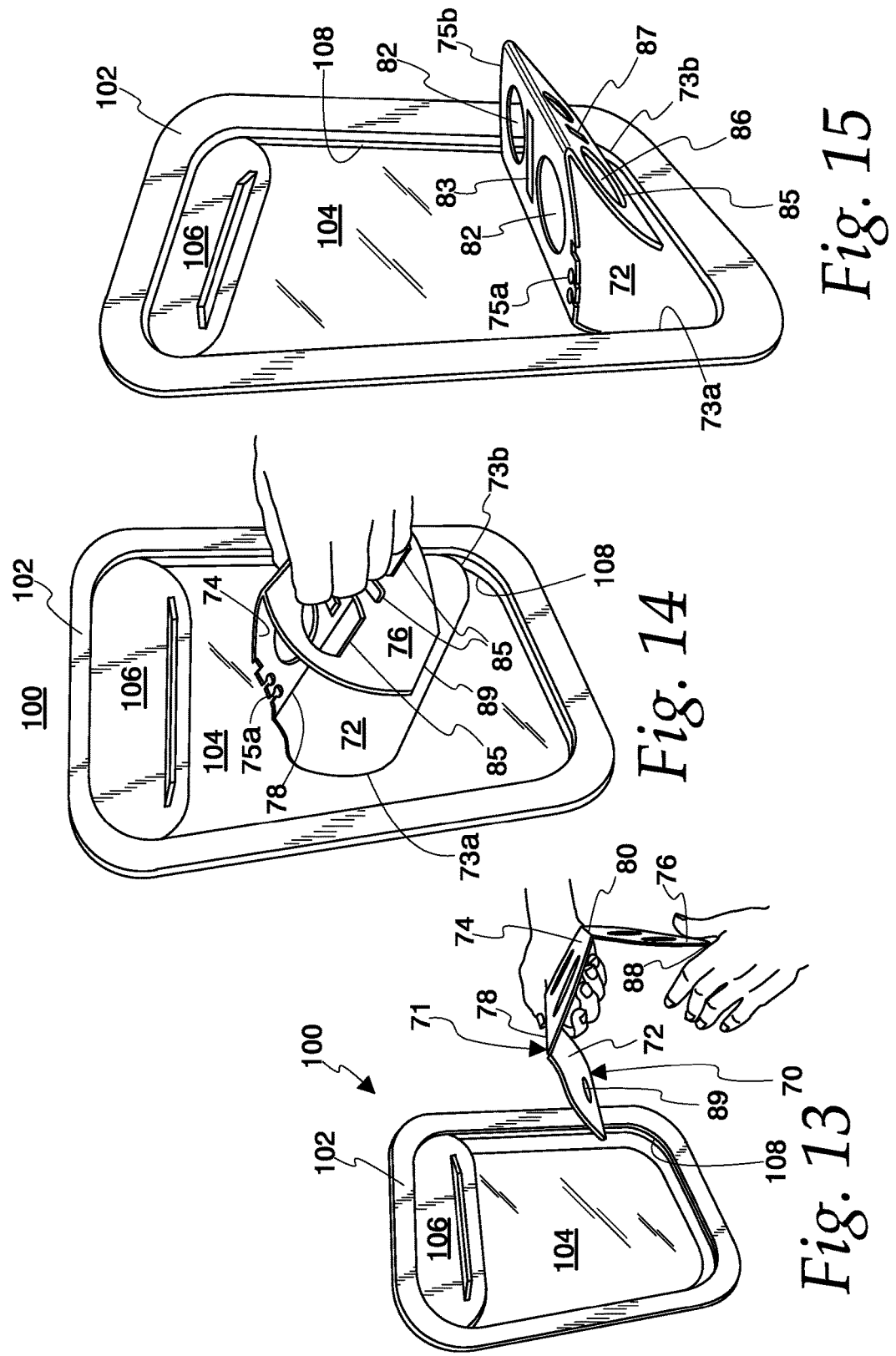

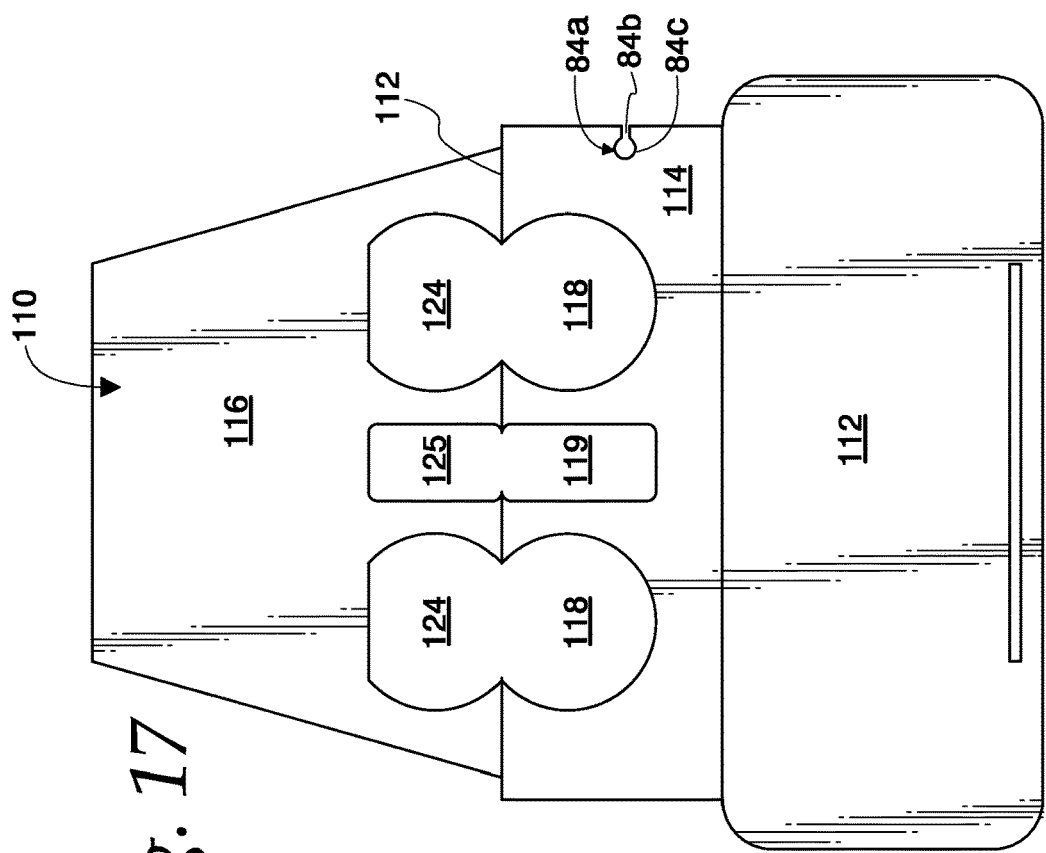
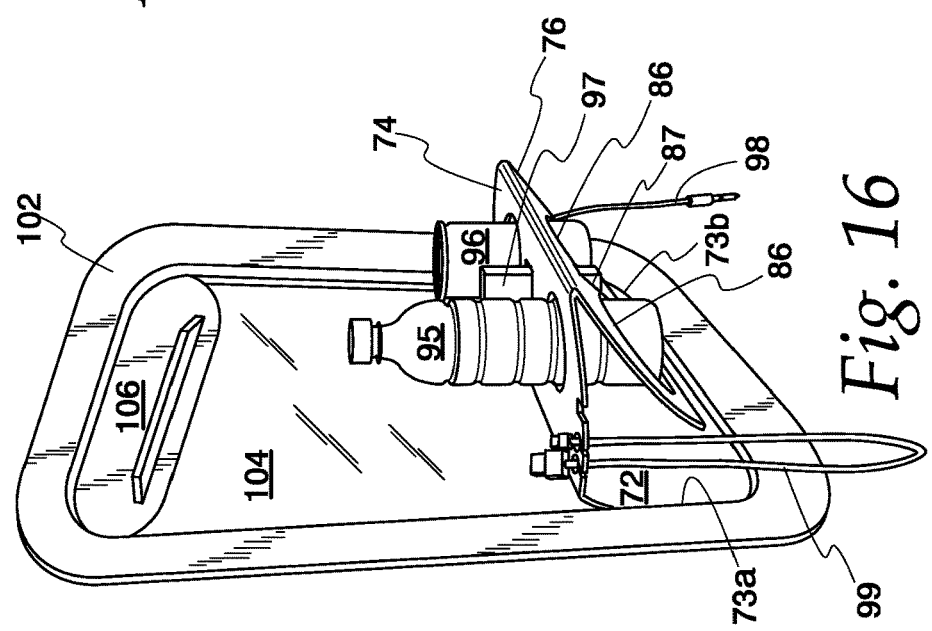

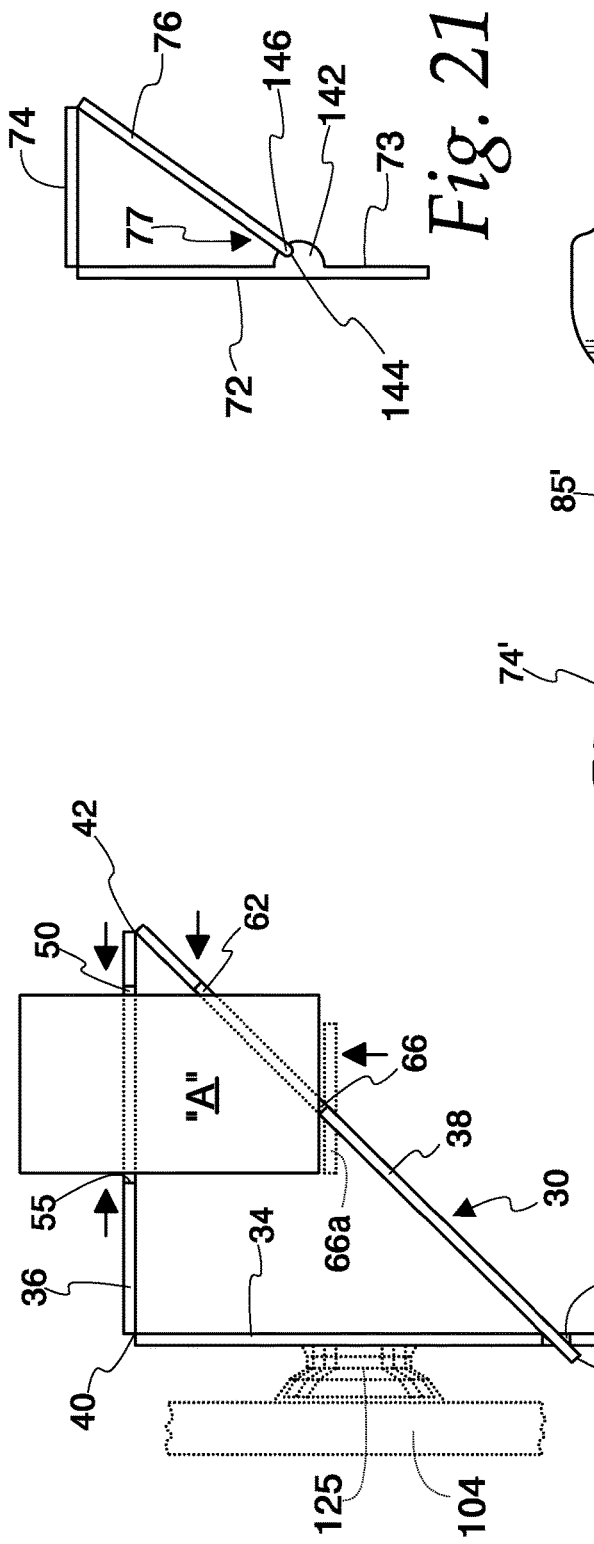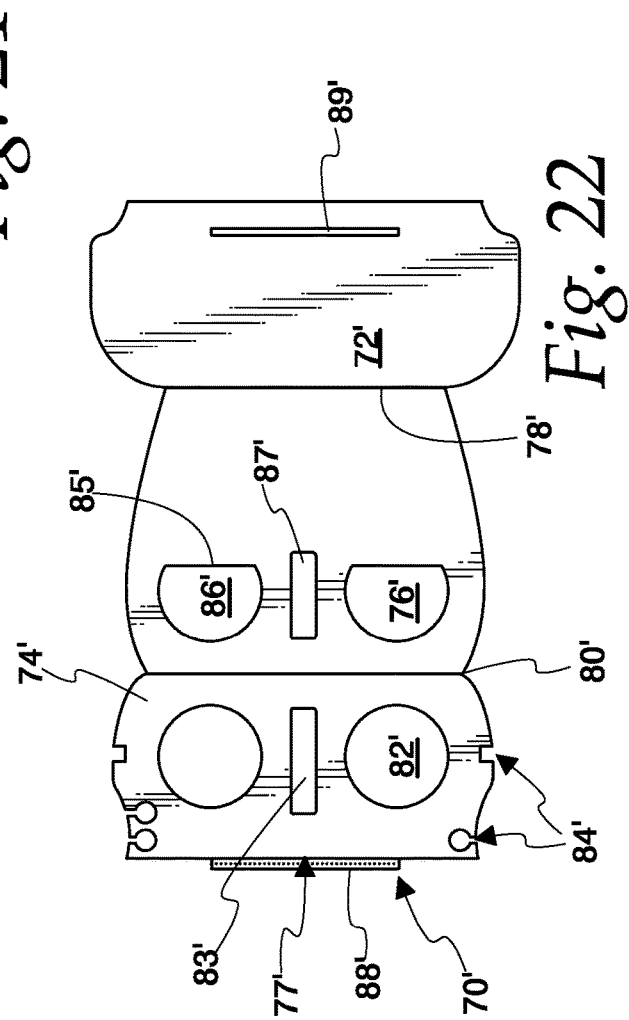

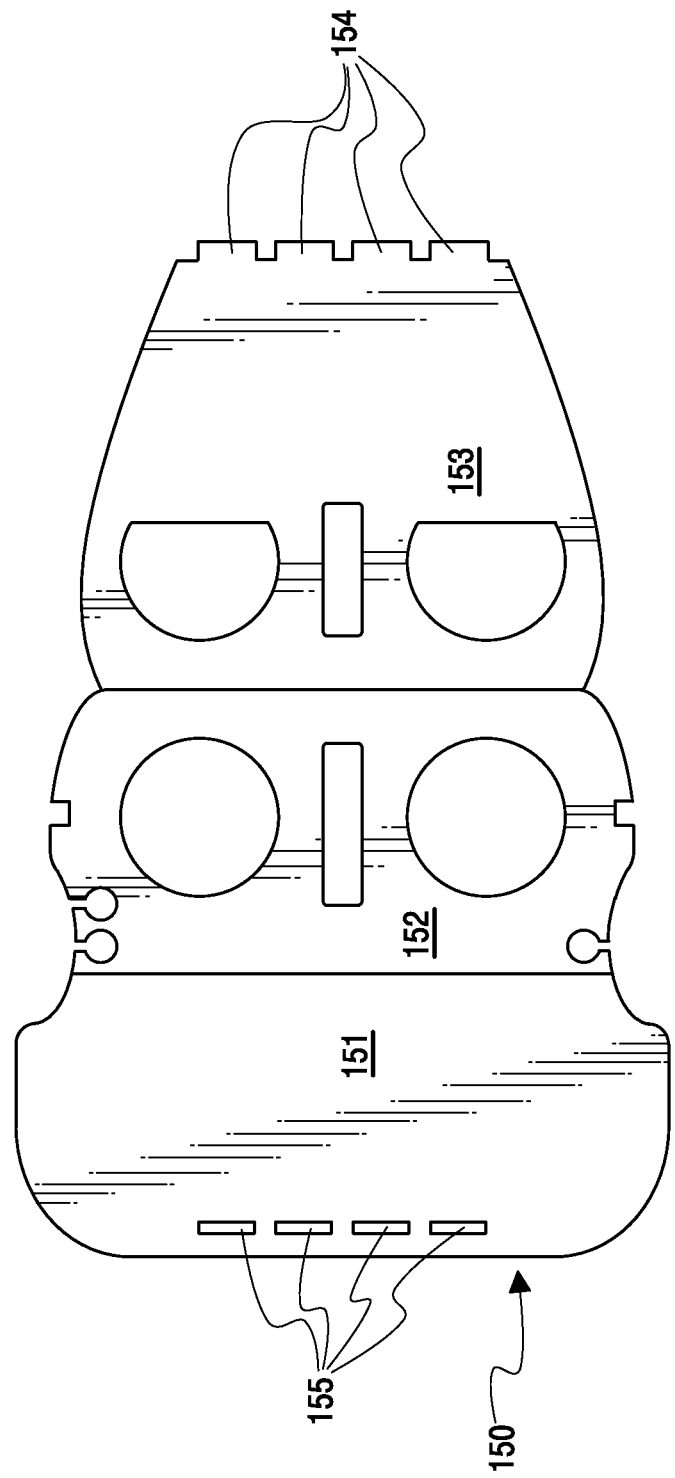

COLLAPSIBLE ARTICLE ORGANIZER FOR AIRLINER USE

REFERENCE TO RELATED APPLICATIONS

This is a non-provisional utility patent application which claims priority under 35 USC 119 (e) of prior U.S. Provisional Patent Application No. 61/790,687, filed on Mar. 15, 2013, the disclosure of which is hereby fully incorporated herein by reference.

BACKGROUND OF THE DISCLOSURE

The present disclosure relates generally to article organizers and more particularly, to improved article organizer that is formed from a single sheet of planar material and which may be folded into a flat, storage condition and then simply assembled into an operating condition.

Air travel has become a necessity in today's business world. Often, an airline passenger will bring work onto an airliner which requires him or her to use a laptop computer. The laptop takes up most of the space on the drop down tray and so the passenger is often precluded from having a beverage on the flight. Additionally, the passenger may have an MP3 player or smart phone that requires attention. This device has to be put in the seat pocket in front of the passenger to make room. There is no suitable device known to me that permits a passenger to utilize cabin wall space for an article organizer that can hold a passenger's beverage, smart phone, PDA, pens and the like either alone, or in combination.

The present disclosure is therefore directed to an article organizer for supporting articles, such as a beverage container, a smart phone or similar electronic device that is particularly suitable for airline use and which is collapsible from its assembled position to a flat, generally planar position.

SUMMARY OF THE PRESENT DISCLOSURE

Accordingly, there is provided a multi-panel article organizer that suitable for airline use, which is appropriately sized and which folds flat when not in use.

In accordance with one embodiment as described in the following disclosure, I have developed an article organizer which is preferably formed from a planar member that includes three distinct panels which are preferably interconnected with each other in a manner so that each panel is hingedly connected to an adjacent panel. The three panels are folded along two spaced-apart fold lines and one of the panels engages an opposing panel to form a triangular shaped structure that has openings which accommodate beverage containers, smart phones, PDAs, pens, pencils, phones and connecting cords and the like which a traveler is likely to carry with him/her on board an airliner. The article organizers of the present disclosure have a folded structure which permits them to be assembled from a flat, unassembled condition into a triangular, assembled condition and when in their unassembled condition, are configured to be easily carried in a briefcase, laptop case, file folder or the like.

The three panels preferably include a base panel that has a vertical orientation and which engages a window frame of a window of the airliner, a support panel that is connected to the base panel and supported at preferably a right angle thereto, and a brace panel that braces and supports the support panel in its projection with respect to the base panel.

In one embodiment, the brace panel is hingedly connected to the support panel at one end thereof and along a first fold line of the blank, and it further has a free end at the opposite end thereof that engages the base panel to hold up the support panel in its horizontal orientation. In another embodiment, the support panel is hingedly connected at one end thereof to the brace panel along a second fold line of the blank and has a free end at its opposite end which engages the base panel to orient the support panel in a preferred orientation, which is substantially a right angle to the base panel.

The support panel includes a plurality of openings disposed in it, and each opening is sized to accommodate a certain article therein. Thus, the article organizers of the present disclosure have openings that are sized and configured to receive beverage containers, smart phones, PDAs and other electronic devices, and pens, pencils, headphones and connecting cables or the like. The larger articles, such as the smart phones, and beverage containers project through the support panel openings in a downward direction and extend for a preselected distance where they contact portions of the brace panel along their bottom surfaces.

The brace panel also contains similar, and preferably, differently sized and configured openings that are aligned with the support panel openings. For most instances, the brace panel openings will have a smaller area than that of their corresponding support panel openings. In this regard, the brace panel openings are preferably aligned with the support panel openings so as to present an edge that is oriented widthwise generally through the center of associated support panel openings were they to be projected downwardly from the support panels. This edge runs across the width of the support panel openings so that the bottom surfaces of the beverage containers and smart phone or other electronic devices inserted into the support panel opening contact the edge within the perimeter of the support panel openings. The brace panel openings thereby provide an additional means of support to the articles.

The base panel is preferably configured to fit within the confines of an airliner cabin window and preferably also includes a hard edge that fits into the window frame slot which may accommodate the window shade. This manner of engagement reliably holds the base panel in place so that the support and brace panels project at a level which will not interfere with the passenger operating a device on his tray table or reading a book thereon or the like. The hinged construction of the multiple panels permits a passenger to easily carry the article organizers of the present disclosure onto the plane in a briefcase, a laptop case, a large purse, or even a simple file folder. In an alternate construction, other means of attachment to the window are contemplated, such as suction cups.

In yet another embodiment of the present disclosure, the base panel is a planar member that has one or more engagement tabs defined therein in the form of U-shaped slots that define the engagement tabs. These engagement tabs may be used to clip the article organizer onto the edge of the seat pocket that faces the passenger, so that the article organizer is not limited in its use to passengers using only window seats.

In yet another embodiment of an article organizer of the present disclosure, the openings formed in the support panel and in the brace panel intersect with each other along the outermost edge of the organizer so that in some instances, the beverage containers may be inserted into the organizer openings in the horizontal direction rather than in the vertical direction.

These and other objects, features and advantages of the present disclosure will be clearly understood through a consideration of the following detailed description.

BRIEF DESCRIPTION OF THE DRAWINGS

The organization and manner of the structure and operation of the disclosure, together with further objects and advantages thereof, may best be understood by reference to the following detailed description, taken in connection with the accompanying Figures, wherein like reference numerals identify like elements, and in which:

FIG. 9 is an elevational view, taken from the side, of the blank of FIG. 8 in an assembled condition to form an article organizer;

FIG. 10 is a front elevational view of the article organizer of FIG. 9;

FIG. 11 is a top perspective view, as viewed from one side thereof, of the article organizer of FIG. 9;

FIG. 12 is a rear elevational view of the article organizer of FIG. 9;

FIG. 13 is a perspective view of an airline passenger assembling the article organizer in the airliner cabin;

FIG. 14 is a perspective view of the passenger inserting the assembled article organizer of FIG. 13 into an airliner window slot;

FIG. 15 is a perspective view of the assembled article organizer of FIG. 14 in place within the airliner cabin window frame;

FIG. 16 is a perspective view of the assembled article organizer of FIG. 14 in place within an airliner cabin window and supporting a USB patch cord, a water bottle, a smart phone, a beverage container and a set of headphones;

FIG. 17 is a top plan view of a blank used in the construction of a third embodiment of an article organizer in accordance with the principles of the present disclosure;

FIG. 20 is a sectional diagram illustrating how article organizers of the present disclosure support articles, as well as with an alternate means of attaching the base panel to an airline cabin window;

FIG. 21 is an diagrammatic view of an alternate manner in which the brace panel may engage the base panel, as by way of an interengaging tongue and groove arrangement;

FIG. 22 is a top plan view of a multi-panel blank that may be used to form the article organizer of FIG. 19;

FIG. 23 is a top plan view of yet another embodiment of an article organizer which utilizes multiple interengaging slots and tabs as an means for attaching the ends of two panels together.

DETAILED DESCRIPTION OF THE DISCLOSURE

While the present disclosure may be susceptible to embodiment in different forms, there is shown in the Figures, and will be described herein in detail, specific embodiments, with the understanding that the disclosure is to be considered an exemplification of the principles of the present disclosure, and is not intended to limit the present disclosure to that as illustrated.

In the illustrated embodiments, directional representations—i.e., up, down, left, right, front, rear and the like, used for explaining the structure and movement of the various elements of the present disclosure, are relative. These representations are appropriate when the elements are in the position shown in the Figures. If the description of the position of the elements changes, however, it is assumed that these representations are to be changed accordingly.

Figure 1:
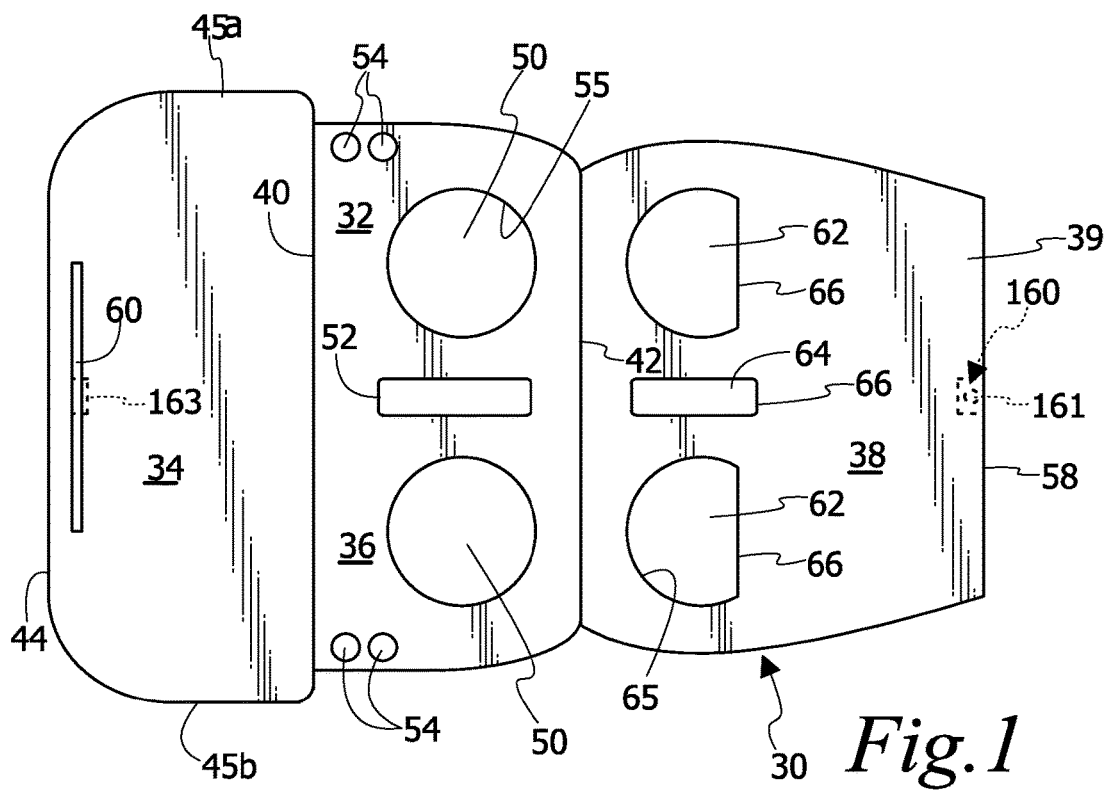
FIG. 1 is a top plan view of a blank used in the construction of a first embodiment of an article organizer in accordance with the principles of the present disclosure.
Figure 2:
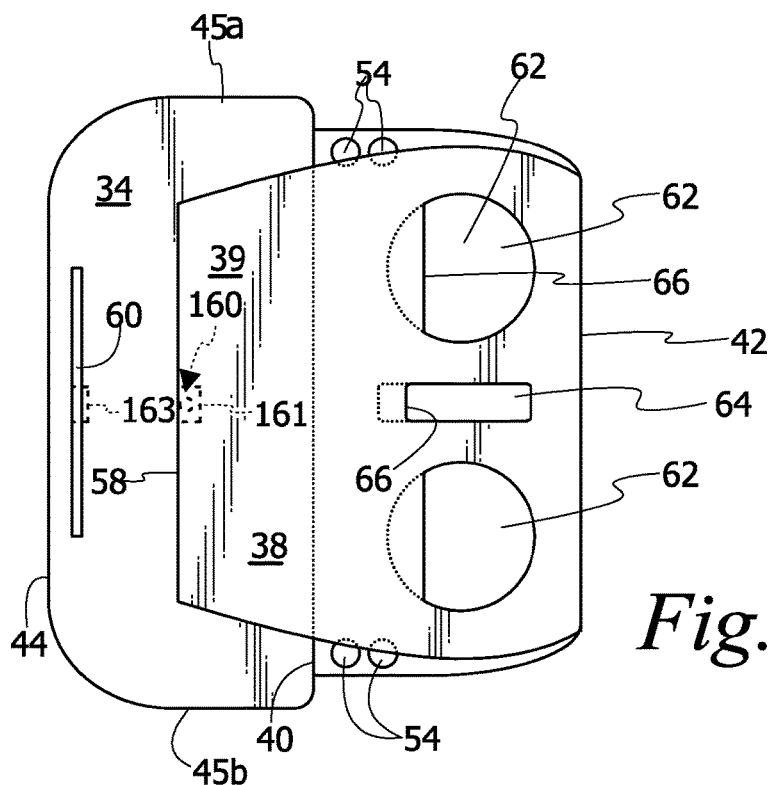
FIG. 2 is a same view as FIG. 1, but with the brace panel folded over onto the remainder of the blank to illustrate a storage condition of the article organizer.

Turning now to FIG. 1, a first embodiment of an article organizer 30 constructed in accordance with the principles of the present invention is shown as taking the form of a generally planar, multi-panel blank 32. The blank 32 has three panels 34, 36, 38 that are hingedly, or otherwise, interconnected to each other along two distinct, first and second fold lines 40 and 42. The three panels include a base panel 34 at one end of the blank 32 that is interconnected to an intermediate support panel 36, which in turn is interconnected to a brace panel 38 that terminates in a free end 39. For storage purposes, as illustrated in FIG. 2, the blank 32 may be reduced in size by folding it upon itself. Specifically, in the embodiment illustrated in FIGS. 1-7, the brace panel 38 is folded along second fold line 42 so that it lies flat primarily upon the support panel 36 and a portion of the base panel 34. In this manner, a user may easily store the organizer 30 in a briefcase, a purse, a laptop bag, a file folder or portfolio or the like, as the footprint of the organizer 30 shown is less than about 9 by 12 inches and preferably less than about 8½ by 11 inches. With this type of footprint, the article organizers of the present disclosure are simple to carry in a briefcase, laptop case or even a file folder in instances where the folded dimensions are about 9×14 inches or less. In another aspect, the base panel 34 may be folded around fold line 40 onto the intermediate support panel 36, and then the brace panel 38 folded over that to further reduce the overall size of the organizer in an unassembled condition.

The blank 32 is easily assembled into an assembled, or usable condition, by forming a triangular structure. In this regard, the support panel 36 is folded outwardly with respect to the base panel 34 along first fold line 40 and the brace panel 38 is folded downwardly with respect to the support panel 36 along second fold line 42. The brace panel free end 39 is configured to form an engagement tab 58 that is received within an associated complementary slot 60 that is disposed in the base panel 34 proximate the base panel bottom edge 44 as illustrated in FIG. 4. Although shown in the drawings, such as FIGS. 1-18, as a slot-tab engagement structure, it will be understood that other engagement structures may be provided. For example, the base panel 34 may include a raised bar, or ridge against which the brace panel free end 39 rests, or it may include a series of slots that receive complementary tabs, plugs, lugs or the like formed along the brace panel free end 39, similar to what is illustrated in FIG. 23.

It will be understood that other means of engaging two of the panels together may be utilized, and that which are shown in the drawings are not meant to be limiting. Although in FIGS. 1 and 2, the engagement tab 58 and corresponding opposing engagement slot 60 are shown as having a width equal to the rightmost edge of the blank 30, it is contemplated that the engagement tab may be smaller in size as shown in phantom at 160, as well as the corresponding engagement slot 163. With such a smaller size, a user is able to easily push the engagement tab 160 into the opposing slot 163 of the base panel 34. In order to provide a means for retaining the engagement tab 160 in engagement with the base panel 34, a raised portion, such as a detent, or bump 161 may be provided on either side of the engagement tab 160. This bump 161 will catch on the slot 163 and serve to keep the engagement tab 160 engaged with the slot 163 and from pulling free from the slot 163.

Figure 3:
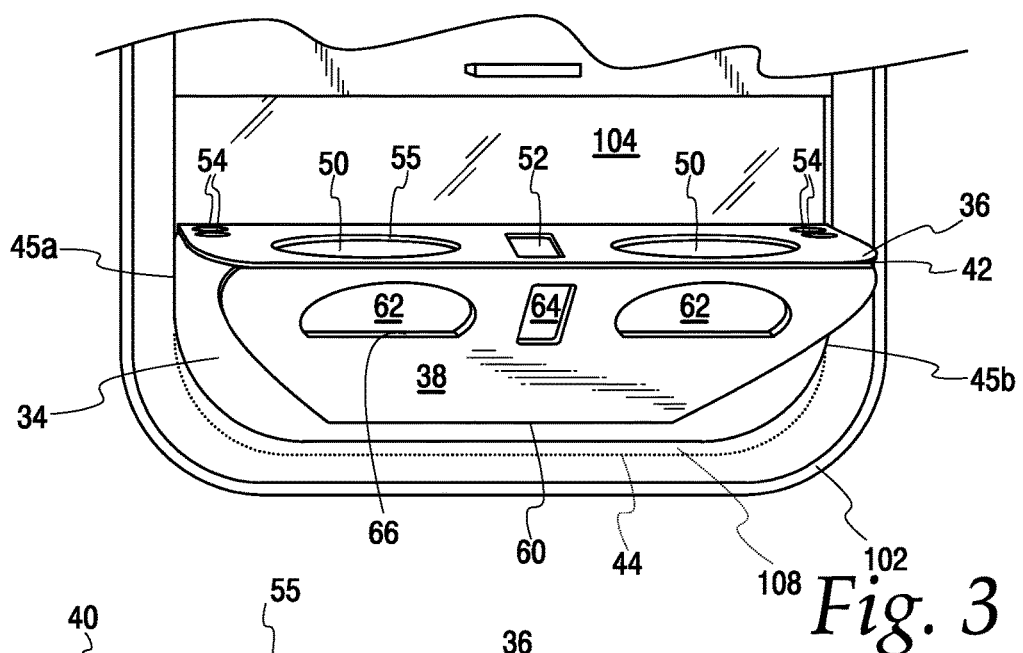
FIG. 3 is a slight perspective view of the blank of FIG. 1, in an assembled condition and supported within the interior framework of an airliner window.
Figure 4:
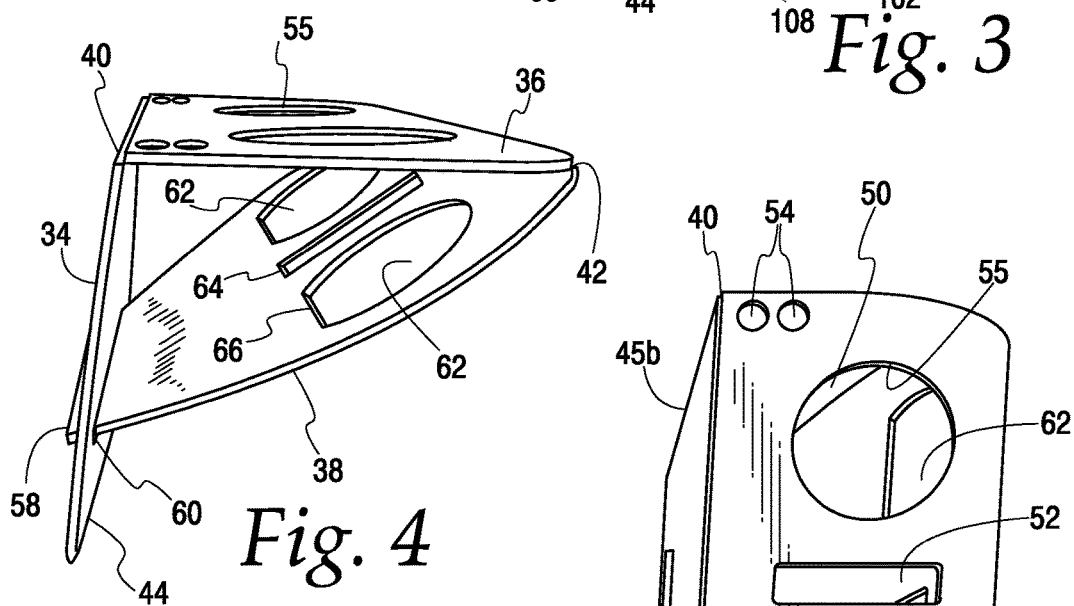
FIG. 4 is a side elevational view, partly in perspective, of the blank of FIG. 1 in an assembled condition illustrating the article-holding openings thereof.

The base panel 34 has a pair of side edges 45a, 45b that are continuous with the bottom edge 44 and which are spaced apart a preselected distance sufficient to fit inside of an airliner cabin window frame 102, as shown in FIG. 3. These base panel edges 44, 45a & 45b will fit into a slot 108 that is disposed in the window frame 102 (FIGS. 13-15) and depending on the location of the slot 108, the base panel 34 may or may not about the plexiglass window 104 of the airliner.

In order to function effectively as an article organizer and not just merely as a shelf, the blank 32, and specifically the support panel 36 thereof is provided with a plurality of openings 50, 52 and 54. Two circular beverage container openings 50 and one rectangular electronic device opening 52 are illustrated in the embodiment of FIGS. 1-7. The beverage container openings 50 are preferably sized to receive a beverage container, such as a water bottle, can or cup with a little play so that the container may be removed from the organizer as well as inserted into it without difficulty that would lead to spillage. The device opening 52 is shown in the drawings as rectangular in configuration and it is disposed between the beverage container openings 50 and oriented transversely to the width direction of the support panel 36. It is sized to receive a smart phone, PDA (personal digital assistant), iPod or the like. The openings 50 & 52 all have an inner rim 55 that serves to support, in the horizontal direction, an article inserted therein. Accessory openings 54 may be provided and used for headphones, pens, pencils, connecting cords and the like. These accessory openings 54 may be disposed as in the rear corners of the support panel 36 as shown in FIGS. 1-7 or along the side edges thereof as shown in FIGS. 8-11. It will be understood that some electronic devices, such as smart phones, PDAs, MP3 players or the like, may also be accommodated within the beverage openings.

Figure 5:
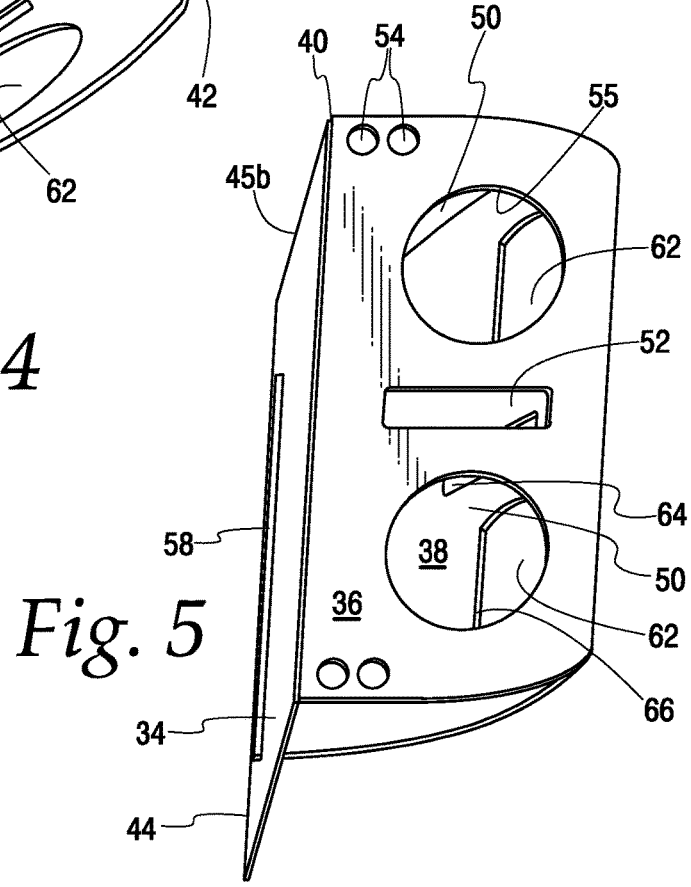
FIG. 5 is a top perspective view of the assembled article organizer of FIG. 4.
Figure 6:
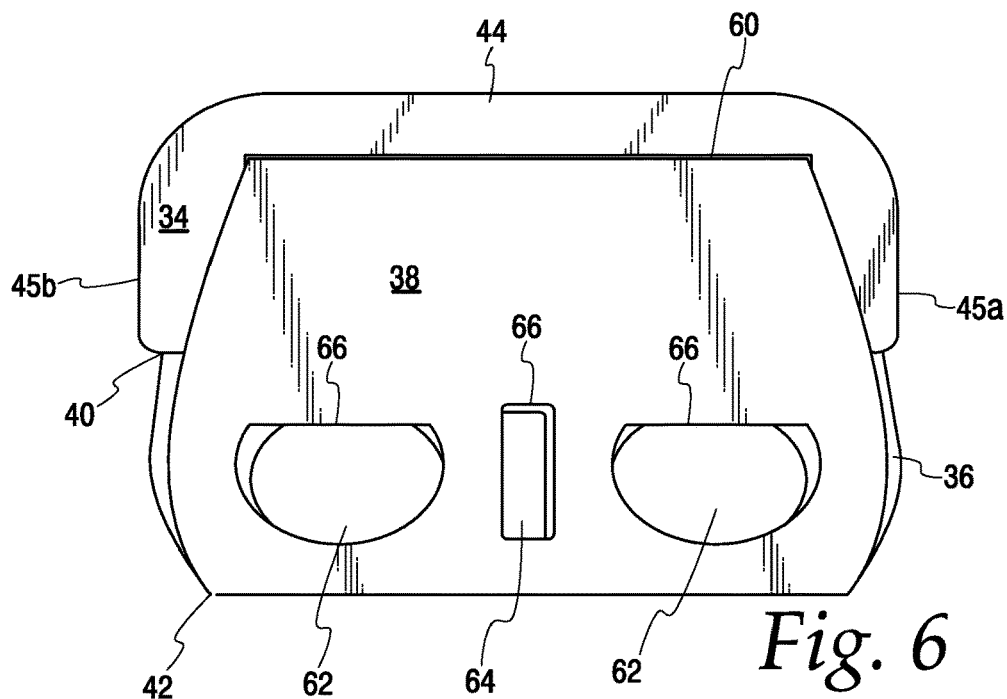
FIG. 6 is a bottom plan view of the article organizer of FIG. 5.
Figure 7:
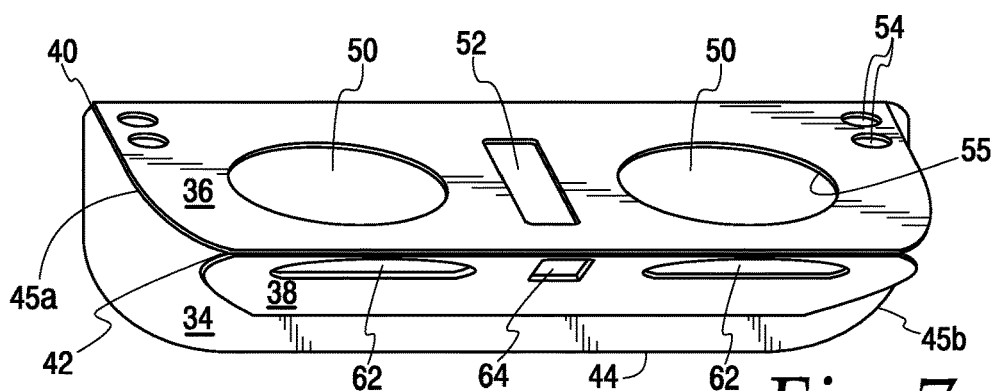
FIG. 7 is front perspective view, taken from above, of the article organizer of FIG. 5.
Figure 8:
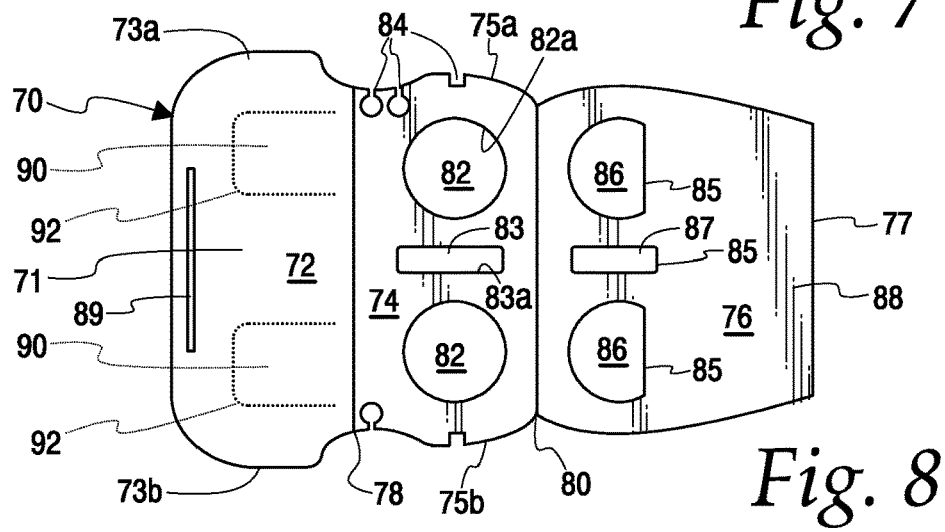
FIG. 8 is top plan view of a blank used in the construction of a second embodiment of an article organizer in accordance with the principles of the present disclosure.

The brace panel 38 includes similar openings such as beverage container openings 62 and a electronic device opening 64. These brace panel openings 62, 64 are preferably disposed in the brace panel 38 so as to align with the support panel openings 50, 52 when the blank is assembled into the organizer 30. The brace panel openings 62, 64 are further different from the support panel openings 50, 52 in that they are at least smaller in area and some of them are different in configuration. (FIGS. 4-6.) The beverage openings 62 are of a different shape than the support panel beverage openings 50 in that they have a truncated circular configuration.

Importantly, each of the brace panel openings 62, 64 have defined thereon, a hard edge 66, disposed underneath the support panel openings 50, 52 that contacts the bottom surface of either the beverage container or the electronic device. This is shown in FIG. 16. The hard edge 66 of each of the openings 62, 64 may be considered as a line that intersects the perimeters of the openings 50, 52 of the support panel 36 if they were to be projected downwardly through brace panel 38. In other words, the hard edges 66 extend transversely with respect to the perimeters of the support panel openings 50, 52 to define a horizontal support that supports an article in the vertical direction. As illustrated in the drawings, the perimeters of the support panel openings provide support in the horizontal direction.

FIGS. 8-11 illustrate a second embodiment of an article organizer 70 constructed in accordance with the principles of the present invention. The organizer 70 is formed from a planar blank 71 that includes three panels, 72, 74 and 76 and which are respectively separated from each other by first and second fold lines 78 and 80. The structure of this organizer 70 is much the same as the organizer 30 of FIGS. 1-7, but for the overall outline thereof. The support panel 74 and brace panel 76 seem narrower in this embodiment as the base panel 72 side edges 73a, 73b extend more outwardly past the side edges 75a, 75b of the support panel 74. This is due to the airliner window slot 108 having a greater side depth at the bottom of the window frame 102, and this configuration facilitates the insertion of the base panel into newer airline cabin window structures.

The three panels 72, 74 & 76 are folded along the first and second fold lines 78, 80 to form a triangular structure as shown in FIG. 9, wherein the support panel 74 extends transversely outwardly with respect to the base panel 72 and the brace panel 76 extends at an angle with respect to both the base panel 72 and the support panel 74. In this manner, the brace panel 76 supports both the support panel 74 and the articles which are inserted into the openings 82, 83 of the support panel 74 by a passenger. The manner of support of articles is shown diagrammatically in FIG. 20, where it can be seen that the inner rims 55 of the support panel openings 50, 52 restrain (and thereby support) an article "A" inserted in the organizer 30. This is shown by the arrows of FIG. 20. The hard edges 66 of the brace panel openings 62 support the article in the vertical direction and restrain it from vertical movement. The hard edge 66 may present either an angled surface that bears against the bottom of the article, resulting in what may be considered as a point contact on the article bottom surfaces, or the hard edge may be inwardly beveled so that it presents a flat surface that bears against the article bottom surface. A clip 66a shown in phantom in FIG. 20 may be utilized to provide a larger support surface. This clip 66a may be integrally formed with the brace panel 38 and bent or folded into a horizontal orientation, or it may be a separate element that clips onto the edge 66.

Additional openings 84 are shown in the form of slots or slotted openings that are disposed along the rear side edges 75a, 75b, of the support panel 74. As demonstrated in FIG. 17, one of these accessory openings 84a is suitable for headphones of connecting cords and the like an includes an opening portion 84c spaced apart from the outer edge of the support panel and a slot portion 84b that extends inwardly to provide a path from the outer edge to the opening portion 84c. This structure permits a user to insert an accessory device, such as a set of headphones, by sliding the wires in along the slot portion 84b and letting the headphone or connector end rest on the support panel.

As with the previous embodiment, the brace panel 76 defines a free end 77 of the organizer that takes the form of an engagement tab 88 that is received within a slot 89 formed in the base panel 72 proximate the lower edge thereof. Alternate means of engagement may be used such as a stop member, or bar, that is formed on the front surface 73 of the base panel 72 or, as illustrated in FIG. 21, a raised bar, or ridge 142, may be formed on the base panel 72 and extend thereon for a preselected horizontal extent. The bar, or ridge 142, preferably includes a groove, or channel 144, formed therein which is configured to receive an opposing and interengaging tongue portion 146 that is formed at the free end 77 of the brace panel 76. Although illustrated as a tongue and groove engagement in FIG. 21, it is also contemplated that the engagement tab 88 may engage the bar in other manners, such as frictionally, adhesively and the like.

FIGS. 13-15 illustrate the manner in which the organizers of the present disclosure may be assembled and used in transit by a passenger flying in an airline cabin 100. Initially, the passenger unfolds the brace panel 76 along the second fold line 80 to expand the blank 71 and then folds the base panel 72 downwardly along the first fold line 78 so that the support panel 74 extends outwardly. The brace panel engagement tab 88 is placed into the base panel slot 89 to form the triangular organizer 70. Once formed, the passenger inserts one of the base panel side edges 73b into the window frame slot 108 as shown in FIG. 14. Then, as illustrated in FIG. 15, the organizer 70 is rotated counter-clockwise so that the base panel other side edge 73a and its bottom edge engage the window frame 102, mostly by way of the window frame slot 108. Preferably, the slot 108 is spaced-apart from the window 104 so that the passenger may operate the window shade 106 without interference.

Once installed, the brace panel openings 86, 87 are aligned with the support panel openings 82, 83 as noted above so that they will receive portions of any articles such as beverage containers or electronic devices therein and the bottom edges 85 of the brace panel openings 86, 87 will engage the bottom surfaces of the articles. This is illustrated best in FIG. 16 where one (on the left) support panel beverage opening 82 receives a water bottle 95 therein, the other (on the right) support panel beverage opening 82 receives a beverage can 96 and the support panel electronic device opening 83 receives a smart phone 97 therein. The openings may be of different sizes such that one can accommodate bottles and the other cans, as illustrated in FIG. 6. Headphones 98 and a connector cord 99 are held in the accessory openings 84.

It can be seen how the bottom edges 85 of the brace panel 76 abut against the bottom surfaces 95a, 96a, & 97a of the articles 95-97. Whereas the bottom edges 85 of the brace panel 76 support the articles in the vertical direction (and restrain downward vertical movement thereof), the interior rims, or edges 82a, 83a of the support panel openings 82, 83 support the articles in the horizontal direction (and restrain horizontal movement thereof). In this manner, the bottom edge 85 of the brace panel can support smaller items in the larger openings, such as a smart phone in a beverage opening.

Figure 18:
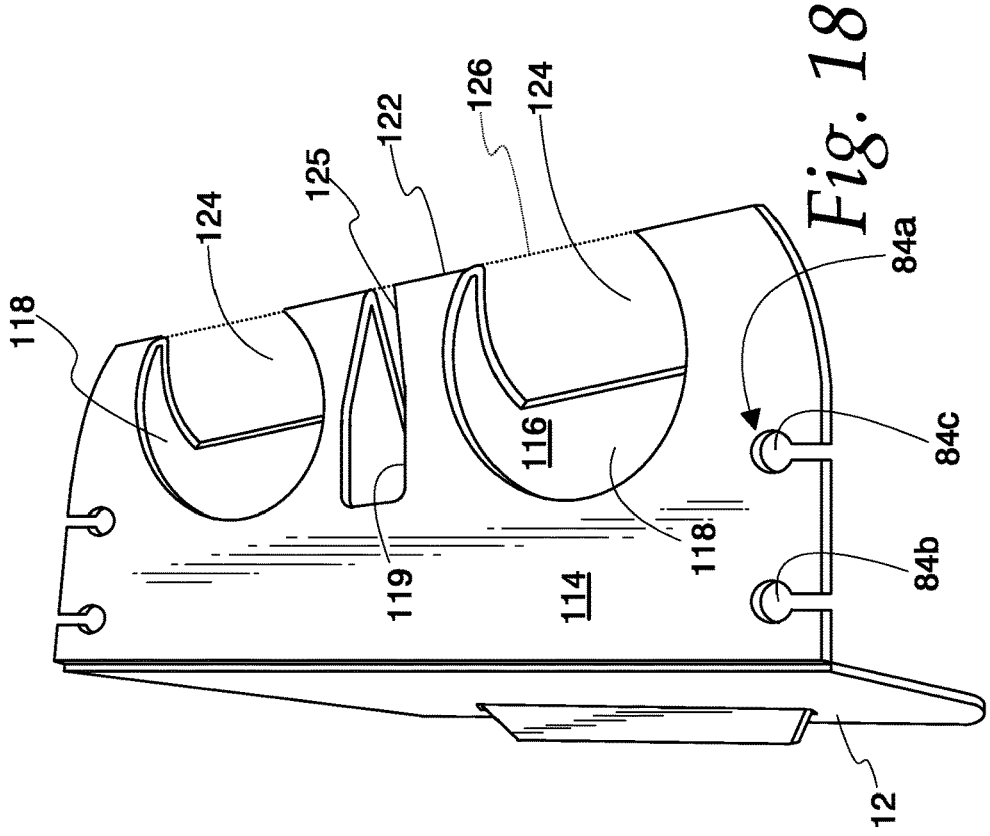
FIG. 18 is a perspective view, taken from above and from one side thereof, of the blank of FIG. 18 in an assembled condition.

FIGS. 17-18 illustrate yet another embodiment of an article organizer 110 constructed in accordance with the principles of the present disclosure. The organizer 110 has three interconnected panels: a base panel 112 for attachment to the airline cabin window, a support panel 114 that extends horizontally relative to the base panel 112, and a brace panel 116 that interconnects the base and support panels 112, 114 at the front of the organizer 110. The support panel 114 includes beverage and device openings 118, 119 and the brace panel 116 also includes a like number of openings 124, 125. In this embodiment, the support panel article-receiving openings 118, 119 intersect with the front, or leading edge 122, of the support panel 114, as do the brace panel article-supporting openings 124, 125. These two sets of openings 118, 119 and 124, 125 intersect at what are referred to herein as "phantom edges" (shown as 126 as a dashed line in FIG. 18) that are aligned with the front edge 122 of the support panel 114 so that the leading edge 122 is discontinuous. The effect of this is that the support panel openings 118, 119 are themselves truncated at their forward ends and the brace panel openings 124, 125 are truncated at their upper ends, as well as at the lower ends where the support edges 127 are defined that contact the bottom surfaces of the articles carried by the organizer 110. This construction saves on space as the support panel 114 is narrower in the horizontal depth direction. It is desirable to have more than about 190 degrees of the circular openings 118 in order to provide the desired support and restraint horizontally and without being large enough for the beverages or devices to slip out of the openings. In effect, it is desirable for the opposing ends of the truncated openings to extend, or pinch inwardly as illustrated.

In FIGS. 8-12, an alternate means of mounting the article organizer 70 is illustrated which is particularly suitable for use by an airline passenger in a non-window seat. A plurality of engagement tabs 90 are shown in phantom in these two Figures and the tabs 90 are defined by U-shaped slots 92 that are formed in the base panel 72. These slots permit the engagement tabs 90 to be bent slightly out of the plane of the base panel 72 so that they can slip over the edge of the seat pocket confronting the passenger. As such, the engagement tabs 90 may be considered as a clip-type structure.

Figure 19:
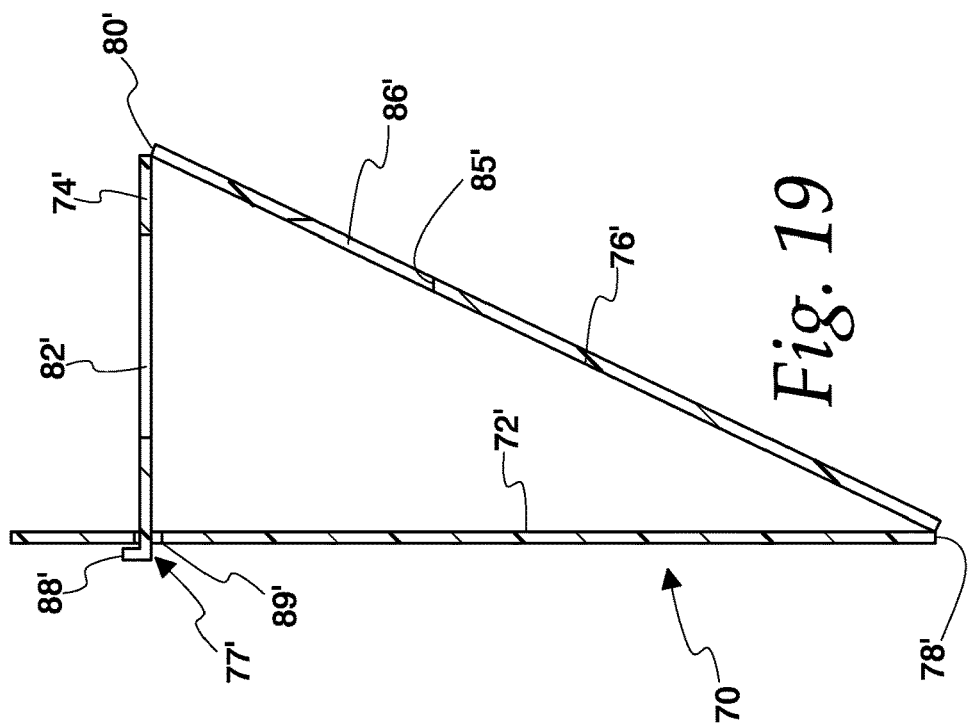
FIG. 19 is a sectional view of a fourth embodiment of an article organizer constructed in accordance with the principles of the present invention and in which the support panel engages the base panel.

FIGS. 19 and 22 illustrate an organizer 70' utilizing an alternate structure for interconnecting together the three panels 72', 74' & 76'. In this embodiment, the base panel 72' is not hingedly connected to the support panel 74' along a first fold line 78', but rather is hingedly connected to the brace panel 76' along the first fold line 78', while the second fold line 80' and its hinged connection remains in place interconnecting the support panel 74' to the brace panel 76'. In this manner, the overall triangular configuration of the organizer 70' is maintained, but the engagement that completes the structure is now located at the upper portion of the base panel 72' rather than at the bottom portion as shown in the embodiments described above. The support panel 74' includes a free end 77' that terminates in an engagement tab 88' with an upturned flange (FIG. 19) that extends through the base panel engagement slot 89' and which bears against the back surface of the base panel 72'.

As noted above, and as illustrated in FIG. 23, an organizer 150 with a base panel 151, support panel 152 and brace panel 153 may have the free end of the brace panel 153 configured to define a plurality of engagement tabs 154 which are spaced apart from each along the free end, These tabs 154 are received within a like number of engagement slots which are formed in the base panel 151 and disposed proximate a bottom edge thereof. Likewise, it is contemplated that the brace panel 153 may be provided with engagement slots and the base panel 151 be provided with engagement tabs that interengage to support the organizer in its operating condition.

FIG. 20 further illustrates an alternate manner of engagement between the organizer and the airline cabin window 104 that may be utilized to engage the organizer 30 with the airline cabin window 104. One or more suction cups 125 may be mounted to the back surface of the base panel 34 at a location preferably from midway to proximate the top edge of the base panel 34 in order to prevent an excessive tipping moment from occurring when the organizer is filled with articles.

The organizers of the present disclosure may be easily formed from a durable plastic by injection molding, and as such the hinge interconnections between adjacent panels may be formed in that process as living hinges. Other means for effecting a hinge may be used, such as adhesive tape or the like. It is even contemplated that a double- or triple-weight cardboard may be used to provide an organizer that is disposable which a passenger may purchase prior to a flight. In other constructions, a light sheet metal such as aluminum may be used. The blanks of the embodiments preferably have an area footprint of no larger than 12 by 14 inches and when one of the panels is folded upon the other two panels, the resulting footprint is no larger than about 9 by 12 inches and preferably about 8½ by 11 inches, such that in an unassembled condition, the article organizer may easily fit in a file folder, laptop case, briefcase, large pruse or the like.

While preferred embodiments have been shown and described, it is envisioned that those skilled in the art may devise various modifications without departing from the spirit and scope of the foregoing Description and the appended Claims.

What is claimed is:

1. An article organizer for use by an airline passenger, which is insertable onto and removable from an airliner cabin structure, comprising:
   a blank including at least three panels separated by first and second fold lines, the panels being foldable relative to each other and foldable from an unassembled condition with a flat configuration to an assembled condition with a triangular configuration; one of the three panels including a base panel extending in a vertical plane, a second of said three panels including a support panel that is oriented outwardly in a horizontal plane with respect to the base panel, and a third of said three panels including a brace panel extending in an angled plane with respect to the vertical and horizontal planes; and,
   said support panel including a plurality of article-receiving openings disposed therein, each of the article-receiving openings including an inner rim that supports an article inserted therein in a horizontal direction, and the brace panel including a plurality of article-supporting openings disposed therein, and in alignment with said article-receiving openings, each of the article-supporting openings including an edge that extends transversely underneath said article-receiving openings which defines an edge that vertically supports articles inserted into said article-receiving opening without the article contacting said base panel for support.

2. The article organizer of claim 1, wherein at least a portion of said base panel is configured to be received within a slot of an airline cabin window frame.

3. The article organizer of claim 1, wherein said brace panel includes at least one engagement tab and said base panel includes an engagement slot disposed therein, the one brace panel engagement tab being received within said base panel engagement slot.

4. The article organizer of claim 1, wherein one of said brace and base panels includes at least one engagement tab and the other of said brace and base panels includes at least one engagement slot for receiving the at least one engagement tab therein.

5. The article organizer of claim 1, wherein said support panel includes a free end that engages said base panel to hold said support panel in its horizontal position.

6. The article organizer of claim 1, wherein said brace panel free end engages a portion of said base panel.

7. The article organizer of claim 1, where a pair of aligned article-receiving and article-supporting openings is configured to receive a beverage container therein, and another pair of aligned article-receiving and supporting openings is configured to receive a handheld electronic device.

8. The article organizer of claim 1, further including at least one accessory opening disposed in said support panel proximate to an edge thereof, said support panel further including a slot extending inwardly from the support panel edge and communicating with the accessory opening in the plane of the support panel, the slot forming a path from said support panel edge into said accessory opening.

9. The article organizer of claim 1, wherein said base panel may be folded flat over at least a portion of said support panel, and said brace panel may be folded flat over at least a portion said base panel into a flat, unassembled condition for storage purposes.

10. The article organizer of claim 1, wherein said panels are hingedly connected together at said first and second fold lines.

11. The article organizer of claim 1, wherein said blank in said unassembled condition, is no larger than about 12 by 14 inches.

12. The article organizer of claim 9, wherein said blank, when said base panel is folded upon said support panel and said brace panel is folded upon said base panel, has a flat configuration no larger than about 9 by about 12 inches.

13. The article organizer of claim 1, further including at least one clip disposed along one of the article-supporting opening edges of said brace panel.

14. A collapsible article organizer, particularly suitable for use in an airline cabin, comprising:
   three generally planar panels interconnected together along first and second fold lines, the three panels including a base panel configured to extend in a vertical plane, a support panel that is oriented outwardly and horizontally with respect to the base panel, and a brace panel extending at an angle with respect to said base panel and the support panel, such that the organizer has a generally triangular configuration;
   said support panel including a plurality of first openings disposed therein that permit the insertion by a user of an article inserted therein; and said brace panel including a plurality of second openings disposed therein and aligned with the first openings, each of the second openings including a brace panel support edge extending transversely with respect to said first openings, only the support edges of the brace panel vertically supporting articles inserted into said first openings; and,
   the article organizer being collapsible into a flat configuration by folding said base panel about the first foldine flat onto at least a portion of said support panel and by folding said brace panel about the second foldline onto at least a portion of said support panel.

15. The article organizer of claim 14, wherein base panel includes an engagement slot for receiving a free end of said blank therein.

16. The article organizer of claim 15, wherein the blank free end is disposed on said brace panel.

17. The article organizer of claim 14, wherein said brace panel has a free end which engages said base panel to thereby support said support panel generally transversely to said base panel.

18. An article organizer configured to fit into an airliner widow and hold certain items of an airline passenger, the organizer comprising:
   at least three panels, adjacent panels being joined together along respective first and second fold lines, the three panels including a vertical base panel, a horizontal support panel and a brace panel extending at an angle between the base and support panel so as to hold said support panel in a horizontal orientation with respect to said base panel, the support panel including first openings configured to receive the passenger items therein, and said brace panel including second openings aligned with the first openings, the brace panel defining horizontal support edges extending beneath said first openings, the horizontal support edges being configured to contact items inserted into said first openings and support the items in a vertical direction; and,
   the first openings of said support panel intersecting with the second openings of said brace panel along the second fold line.

* * * * *